Dec. 24, 1957  K. DANIEL  2,817,112
DEVICE FOR SOUND RECORDING
Filed April 29, 1953

INVENTOR
KARL DANIEL

BY Mason, Porter, Diller & Stewart
ATTORNEYS

United States Patent Office 2,817,112
Patented Dec. 24, 1957

2,817,112

DEVICE FOR SOUND RECORDING

Karl Daniel, Porz near Cologne, Germany

Application April 29, 1953, Serial No. 351,973
In Germany October 24, 1949

Public Law 619, August 23, 1954
Patent expires October 24, 1969

2 Claims. (Cl. 18—5.3)

This invention relates to a device for producing endless sound tapes. The tapes manufactured by this device have sound grooves which are capable of being played mechanically and which extend spirally and parallel or almost parallel to the edge of the tape and extend alternately from one side of the tape to the other due to the fact that the ends of the tape have been twisted to the extent of 180°.

The manufacture of such sound tapes by prior art methods developed considerable difficulties. The tapes which are to be inscribed by sound tracks on both sides are made from two matrix halves which impress the sound grooves on the tape and which must remain in contact with the tape for a time sufficient to enable the tape to cool off. This necessity of maintaining the tape in contact with the matrix halves presents certain difficulties. Other difficulties arise due to the fact that in order to produce tapes inscribed on both sides the ends of the tapes must be twisted by 180° before being joined and then the grooves upon one side must coincide exactly with the grooves on the other side. This requirement for the exact position of the groove ends was found to be quite difficult to maintain in view of the fact that the matrix tapes may be moved during the stamping operation.

An object of the present invention is to eliminate the drawbacks and difficulties of prior art methods and to improve in general methods of manufacturing endless tapes which are sound inscribed on opposite sides.

Other objects of the present invention will become apparent in the course of the following specification.

In attaining the objects of the present invention, it was found desirable to provide two half lengths of a matrix tape on opposite sides of a stretched hot moldable tape. The half lengths of the matrix were previously produced from an endless wax tape which was inscribed on one side in the usual manner. The half lengths of the matrix tape are pressed simultaneously and in registry continuously length by length until the entire tape has been inscribed. Then the edges of the inscribed tape are twisted through 180° and are joined to form an endless band which is inscribed on both sides.

This process can be advantageously employed for the mass production of endless, twisted sound tapes of the described type. A hot moldable tape having a length, which is a multiple of the length of the finished tape, may be fed length by length over a flat press bed carrying one-half of a stamping matrix. The tape is inscribed on both sides while it is stationary between its step-wise movements by progressive pressing of the halves of the stamping matrix. Thereupon, the inscribed lengths of the tape are cut off, their ends are twisted to the extent of 180° and then the ends are joined to form an endless band.

It is advisable to pull each section of the tape as soon as it has been stamped during the progressive step by step pressing of the halves of the stamping matrix.

In accordance with the present invention, a tape stamping device is provided which includes a flat press bed, consisting of two halves and having opposed pressing surfaces which are adapted to receive the halves of the stamping matrix. The apparatus is also provided with a heating device which is slidable along the bed and which is also used to exert pressure upon the section of the tape which is subjected to the pressing operation. A cooling device, preferably follows the movements of the heating device and is so constructed that it also exerts pressure on the tape while the tape is being inscribed by a pressing operation. The two halves of the flat press bed of the stamping device are preferably joined along two adjacent longitudinal edges by a hinge which is so constructed that it not only opens the press bed but makes it possible for the two bed parts to move during the pressing operation, namely, in the closed position of the bed toward each other in the direction of the pressing forces while maintaining the pressing surfaces strictly parallel one to the other.

The invention will appear more clearly from the following detailed description when taken in connection with the accompanying drawing, showing by way of example a preferred embodiment of the inventive idea.

Figure 2:
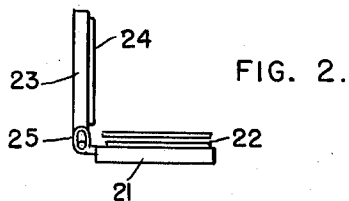
Figure 2 is a side elevation of a press bed in the open position.

The tape manufacturing device illustrated diagrammatically in the drawings may be used effectively for the manufacture of endless twisted tapes inscribed with sound on both sides. The apparatus consists of a flat press bed having a lower portion 21 and an upper portion 23. The lower portion 21 is adapted to receive a tape like stamping matrix 22, while the upper bed part 23 is adapted to receive a tape like stamping matrix 24. The matrix tapes are completely stretched when they are mounted in the press bed. A hinge 25 joins the press bed parts 21 and 23 along one of their longitudinal sides, so that the upper press bed part 23 may be swung away from the lower part 21. Figure 2 shows the upper press bed part 23 in its open position. The joint 25 is so constructed that it can be used not only to open up the press bed but it makes it possible in the closed position of the bed for the two press bed parts to move toward each other in the direction of the pressing forces while maintaining the pressing surfaces parallel to each other.

The two matrix tapes 22 and 24 are equal parts of a stamping matrix which has been produced in the usual manner from an endless wax tape provided with mechanical sound recording.

Figure 3:
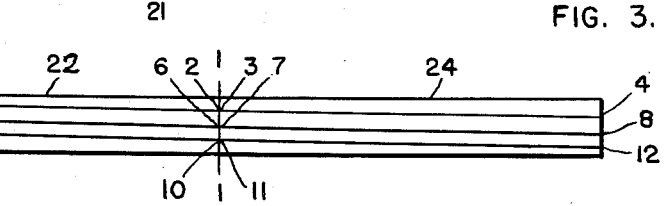
Figure 3 illustrates the two matrix halves in top view.

The two matrix halves are shown in Fig. 3. It is apparent that the matrix has a plurality of sound grooves which join each other and which extend substantially parallel to the edge of the tape. In Fig. 3 the matrix is shown as having only three sound grooves for the sake of simplicity, although actually the number of grooves will be considerably greater. The first groove extending through both halves of the matrix is designated by the numbers 1, 2, 3, 4. The corresponding second groove is designated by the numbers 5, 6, 7, 8, while the third groove is designated by the numbers 9, 10, 11, 12. The beginning of the three grooves upon one matrix half 22 are designated by the numbers 1, 5 and 9 respectively, while the ends of the same grooves upon the second matrix half 24 are designated by the numbers 4, 8, 12. The numbers 2 and 3 designate the end of the first groove upon the first half 22 of the matrix and the beginning of the same groove upon the second half 24 of the matrix. Similarly, numbers 6 and 7 designate corresponding ends of the second groove while numbers 10 and 11 represent the corresponding ends of the third groove.

Figure 4:
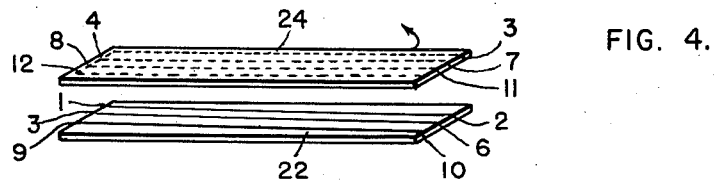
Figure 4 is a diagram illustrating in perspective a part of the pressing operation.
Figure 5:
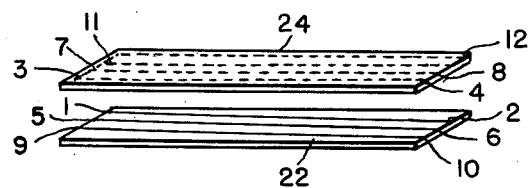
Figure 5 is another diagram illustrating in perspective another feature of the pressing operation.

It is apparent that in order to produce endless sound tapes which are inscribed on both sides, the matrix halves 22 and 24 must be located in precise positions in the press bed. The correct relative position of the matrix halves is attained when the half 24 of Fig. 3 is folded about the central dividing line 1—1 so that the ends of the sound grooves will be located directly above one another namely, so that the end of the matrix half 24 will be located above the beginning of the matrix half 22. This position is indicated in Fig. 4 of the drawing. Thereupon, the matrix half 24 is turned to the extent of 180°, as indicated by the arrows in Fig. 4. Then the groove ends 3, 7 and 11 will be located above the groove ends 1, 5 and 9, as shown in Fig. 5. At the same time, the groove ends 4, 8 and 12 will be located above the groove ends 2, 6 and 10, as also shown in Fig. 5. In this position the edges and the groove ends of the matrix half 24 are transposed by comparison to the position which they occupy in Fig. 4. Throughout the specification and claims this position is referred to as a "transposed position."

Figure 6:
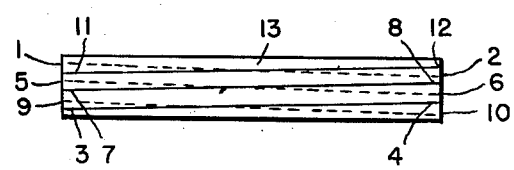
Figure 6 is a plan view of a finished length of tape.

If now a length of tape 13 is introduced between the matrix halves 22 and 24, then the upper surface of the tape will carry sound grooves impressed by the matrix half 24 and designated by the numbers 11, 12, 7, 8, and 3, 4, These sound grooves are indicated by full lines in Fig. 6.

The underlying surface of the hot moldable tape will carry the impression of the grooves provided upon the underlying surface of the mold half 22. These are the grooves 1—2, 5—6, and 9—10, and they are indicated by broken lines in Fig. 6. Thereupon, one end of the tape shown in Fig. 6 is twisted to 180° in relation to the other end and then the two ends are joined together. It is apparent that when this is accomplished then the groove end 2 will be joined to the groove end 3, the groove end 4 will be joined to the groove end 5 and the groove end 10 will be joined to the groove end 11. Thus, a continuous sound groove will be formed which will commence at 1 and terminate at 12 and which will move alternately from one side of the tape to the other. The described twisted operation will serve to bring opposite faces of the stamped tape into the same plane at the line of junction.

Figure 1:
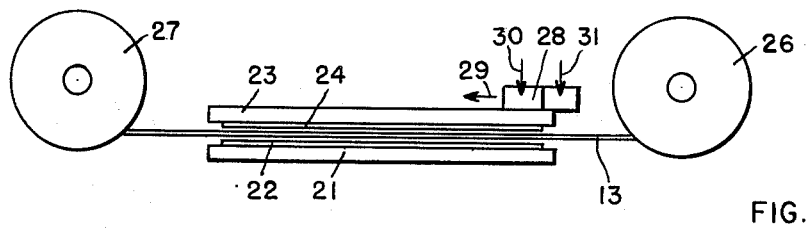
Figure 1 is a diagram showing in front elevation a tape pressing device constructed in accordance with the present invention.

For the mass production of endless sound tapes, it is advisable to use a hot moldable tape, the length of which exceeds by a multiple the length of the finished tape. This tape is wound upon a drum 26, shown in Fig. 1, and is pulled intermittently between the stamping matrix halves 23 and 24. During the stationary periods between the drawing of the tape, the tape is inscribed by pressing against it from opposite sides the matrix halves 22 and 24.

As soon as the desired length of the tape has been stamped, it may be cut off from the rest of the tape. On the other hand, the inscribed tape may be first wound upon a tape drum 27 mounted behind the stamping device. The required lengths of tape may be cut off individually, as required, from the drum 27.

As soon as the length of tape is cut off, it may be wound to form a roll and thereupon its ends are twisted to the extent of 180° relatively to each other, whereupon these ends are joined to form an endless band.

In accordance with an improvement of the inventive idea, the tape may be heated during the stamping process by the heating device 28, which may be mounted upon the upper surface of the press bed part 23 and which may slide along the part 23 in the direction of the arrow 29. The heating device 28 will then act as a flatiron exerting pressure upon the matrix halves 24 and 22 and upon the tape located between them in the direction of the arrow 30.

A cooling device 31 may be mounted behind the heating device 28 and may be movable either with the heating device 28 or separately from it, so that as soon as the matrix halves and the tape have been heated they will be cooled length by length immediately upon the completion of the stamping operation. The cooling device 31 also may be substantially heavy in weight, so that it will exert substantial pressure against the matrix halves 22 and 24 and the tape located between them.

It is apparent that the hinge 25 is used to raise the press bed section 23 relatively to the section 21 when the tape is to be inserted between the two matrix halves. Then, the part 23 is swung upon the hinge 25 from the position shown in Fig. 2 to the closed position shown in Fig. 1.

Lateral guides (not shown) may be used to guide the tape in the course of its intermittent movements into the press bed. While for the sake of illustration the tapes have been shown in the drawings as being wide and short, in actual practice tapes of entirely different sizes may be employed.

By way of example, it is possible to stamp tape lengths of 50 meters, while the width of the tape may amount to a few centimeters.

It is apparent that the example shown above has been given solely by way of illustration and not by way of limitation, and it is subject to many variations and modifications within the scope of the present invention. All such variations and modifications are to be included within the scope of the present invention.

What is claimed is:

1. A device for simultaneously stamping a unitary sound tape on both sides, said device comprising a flat press bed having two parts, a hinge joining said two parts, said two parts having opposed press surfaces, two successive halves of a stamping matrix carried by said opposed press surfaces in transposed relation, and a heating device slidable lengthwise upon said flat press bed and adapted to exert localized pressure upon successive sections of the sound tape being inscribed.

2. A device in accordance with claim 1, comprising a cooling device connected with said heating device and movable therewith, said device being adapted to exert pressure upon the section of the sound tape being inscribed after application of said heating device.

References Cited in the file of this patent

UNITED STATES PATENTS

| | | |
|---|---|---|
| 1,308,111 | Porzel | July 1, 1919 |
| 2,121,170 | Konishi | June 21, 1938 |
| 2,214,406 | Daniel | Sept. 10, 1940 |
| 2,305,800 | Westerkamp | Dec. 22, 1942 |
| 2,385,595 | Woitscheck | Sept. 25, 1945 |
| 2,565,248 | Lyijynen | Aug. 21, 1951 |
| 2,616,125 | Colombo | Nov. 4, 1952 |
| 2,632,207 | Mahla | Mar. 24, 1953 |